United States Patent Office 3,806,417
Patented Apr. 23, 1974

3,806,417
CARRIER-BOUND ENZYME PREPARED BY RE-
ACTING AN ENZYME WITH A COMPOUND
CONTAINING AN EPOXY GROUP AND AN
UNSATURATED DOUBLE BOND AND THEN
POLYMERIZING WITH AN OLEFINIC MON-
OMER
Klaus Beaucamp and Hans Ulrich Bergmeyer, Tutzing,
Upper Bavaria, Karl-Heinz Botsch, Bernried, Upper
Bavaria, and Dieter Jaworek and Michael Nelboeck-
Hochstetter, Tutzing, Upper Bavaria, Germany, as-
signors to Boehringer Mannheim GmbH, Mannheim-
Waldhof, Germany
No Drawing. Filed June 2, 1972, Ser. No. 258,968
Claims priority, application Germany, June 9, 1971,
P 21 28 743.4
Int. Cl. C07g 7/02
U.S. Cl. 195—63        15 Claims

ABSTRACT OF THE DISCLOSURE

Carrier-bound proteins are prepared by reacting a pro-
tein in aqueous solution with a compound having at least
one epoxy group and at least one additional functional
group capable of producing a bond with a carrier material
and reacting the resulting product with a carrier material,
optionally forming the carrier material in situ by polymeri-
zation of a monomer or monomer mixture.

---

The present invention is concerned with a new proc-
ess for the preparation of carrier-bound proteins, as well
as with the proteins bound to water-insoluble carriers ob-
tained according to this process.

The interest in carrier-bound proteins, especially car-
rier-bound enzymes, is continuously increasing and nu-
merous carrier materials and fixing methods have already
been described. However, only a few of the previously
known methods and carrier materials give really satisfac-
tory products with a high activity and in good yield and
of sufficient stability. Therefore, only a few carrier-bound
enzymes have hitherto been commercially available and
these are the especially stable proteolytic enzymes. This
is particularly due to the fact that the more sensitive en-
zymes or enzyme complexes either completely lose their
activity when fixed by the previously known methods or
are so unstable that they cannot be used for technical
purposes.

The present invention provides an especially mild proc-
ess for binding proteins to insoluble carriers, which gives
products which not only have a high activity and activity
yield but which are also, above all, so stable that they can
be used for technical purposes. Only by fulfillment of
these requirements is it possible technically to utilize the
principal property of the enzymatically-active proteins of
not being consumed and of being reusable for long periods
of time.

The present invention comprises a process for the prep-
aration of carrier-bound proteins, wherein a protein is
reacted in aqueous solution with a compound containing
at least one epoxy group and at least one further func-
tional group capable of producing a bond with a carrier
substance, whereafter this further functional group is re-
acted with a carrier substance.

The process according to the present invention results
in the protein forming a covalent bond with the epoxy
group-containing compound, with opening of the epoxy
group. The intermediate product thus obtained is, with-
out further isolation, connected with an appropriate car-
rier by reacting the further functional group with the car-
rier substance.

The further functional group is preferably one which
can add on to or condense with the actual carrier substance. When epoxy compounds are used which contain
a group capable of condensation, care is to be taken that,
during the condensation, no substances are split off which
disadvantageously influence the activity of the bound pro-
tein. In order to ascertain whether the use of particular
group capable of condensation results in the splitting off
of a product which impairs the activity of the initially used
enzyme, can easily be determined for each particular pro-
tein to be bound, by means of a few simple preliminary
experiments. However, general predictions regarding the
suitability of particular groups cannot be made because
the various active proteins have greatly differing sensi-
tivities. For example, the splitting off of halides can lead
to a loss of activity of many sensitive proteins, whereas
other active proteins are not disadvantageously influenced.

The connecting of the intermediate product with the
carrier material can take place in an especially mild man-
ner by polymerizing it into the carrier substance. There-
fore, according to a preferred embodiment of the process
of the present invention, there is used an epoxy compound
which contains at least one copolymerizable double bond
as further functional group which can form a bond with
a carrier material.

The carrier substances used in the process according to
the present invention can be any water-insoluble solid
substances which via the further functional group of the
epoxy compound, can be connected therewith in aqueous
solution under mild conditions. Carrier substances are
preferably used which are hydrophilic, easily swellable
and substantially free of charges and also stable towards
micro-organisms. The carrier substance can, as such, be
introduced into the aqueous solution for the production
of the bond with the intermediate product but preferably
the carrier substance is produced in the aqueous solution
itself by polymerization of water-soluble monomers. In
the case of this preferred embodiment of the process ac-
cording to the present invention, the reaction of the pro-
tein with the epoxy compound can either take place (a)
in the presence of the polymerizable monomer(s), the
polymerization thereby being achieved with polymeriz-
ing of the epoxy compound-protein intermediate prod-
uct, or (b) the polymerizable monomers or monomer
mixture is added to the solution after the reaction between
the protein and epoxy compound and then the polymeri-
zation is initiated.

As monomers for this embodiment of the process ac-
cording to the present invention, there can be used those
water-soluble compounds which can undergo poly-addi-
tion or poly-condensation. Monomers capable of polyaddi-
tion are preferred and especially those monomers which
contain at least one olefinic double bond. In this case, the
further functional group of the epoxy compound is pref-
erably also a copolymerizable double bond.

Preferred epoxy compounds for the above embodiment
of the process according to the present invention have the
general formula:

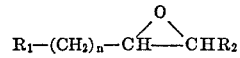

wherein $R_1$ is a mono- or poly-unsaturated alkenyl radical, an
alkenyloxy radical or an unsaturated acyl, i.e., al-
kanoyl, the CO group of which is preferably con-
jugated with a carbon-carbon double bond;
$n$ is 0, 1 or 2; and
$R_2$ is a hydrogen atom or a lower alkyl radical.

By "lower alkyl radical" there is hereby to be under-
stood a straight or branched radical containing up to 4
carbon atoms. The substituent $R_1$ preferably contains
2 to 6 carbon atoms but longer radicals of, e.g., up to 10
carbon atoms, can also be used so long as the water-solubility of the epoxy compound is not too strongly reduced.

An especially preferred group of epoxy compounds can be derived from 2,3-epoxypropanol, in which a hydrogen atom is possibly replaced by a lower alkyl radical, which is connected with a further olefinically-unsaturated compound with ester or ether formation.

Preferred examples of the substituent $R_1$ include the allyloxy, methylallyloxy, ethylallyloxy, dimethylallyloxy, methylethylallyloxy, propylallyloxy and diethylallyloxy radicals, as well as other allyloxy homologues which are still sufficiently water-soluble in combination with the epoxy group-containing part of the molecule. $R_1$ can preferably also be an acyl radical in which an oxo group is conjugated with a double bond. These so-called "Michael systems," enable, on the one hand, an especially gentle bonding with the carrier and are, on the other hand, especially water-soluble. Such radicals $R_1$ can be derived, for example, from $\alpha,\beta$-unsaturated acids, such as acrylic acid, methacrylic acid, fumaric acid and maleic acid. Examples of such compounds of the above general formula include acrylic acid-(2,3-epoxypropyl ester), methacrylic acid-(2,3-epoxypropyl ester), maleic acid-(2,3-epoxypropyl monoester), maleic acid-(2,3-epoxypropyl diester), fumaric acid-epoxy-(2,3-epoxypropyl monoester), fumaric acid-(2,3-epoxy-propyl diester), acrylic acid-(2,3-epoxybutyl ester), acrylic acid-(2,3-epoxypentyl ester), acrylic acid-(2,3-epoxyhexyl ester) and the corresponding esters of methacrylic, fumaric and maleic acid, 1-(allyloxy)-2,3-epoxybutane and the like.

The monomer used in the preferred embodiment of the process according to the present invention must, as already mentioned, be water-soluble and also contain a polymerizable olefinic carbon-carbon double bond. Preferably, here, too, there are also used compounds containing the Michael system, i.e., with a carbon-carbon double bond adjacent to a carbon-oxygen double bond. Especially preferred monomers are the water-soluble derivatives of acrylic acid and/or methacrylic acid, for example, the amides, nitriles and esters of these compounds. Quite especially good results can be achieved with the use of acrylamide. The compounds can also be substituted by alkyl radicals, so long as the water-solubility of the compound is hereby not too strongly suppressed. Compounds of this type with reduced water-solubility are, however, of advantage if, later on, the carrier-bound enzyme is to be used in not purely aqueous systems, for example in an aqueous organic medium. The corresponding derivatives of maleic and fumaric acid can also be advantageously used.

Alternatively, non-water-soluble monomers can also be used. In this case, the polymerization is carried out in suspension and not in solution. Suspension polymerization is of advantage if a finely divided pearl-shaped matrix without swellability in aqueous systems is desired. The polymer spheroids obtained according to known methods of suspension polymerization (pearl polymerization) then have the protein-epoxy compound addition product polymerized onto the surface thereof.

There can be used a single polymerizable monomer or a mixture of monomers. It is also possible to use a prepolymer which still contains unsaturated groups, together with a monomer.

Depending upon the desired consistency of the end product, cross-linking compounds can also be added to the monomer which contain more than one polymerizable group. Examples of such cross-linkers include N,N'-methylene-bis-acrylamide and ethylene diacrylate. These are preferred when working in aqueous solution. If the polymerization is carried out in a heterogeneous phase, i.e., a suspension polymerization, water-insoluble cross-linkers, for example divinyl-benzene and ethylene-dimethacrylate, can also be used. Numerous other cross-linkers are also known and the appropriate choice to be made in a particular case lies within the scope of the expert's ability. It is also possible subsequently to cross-link carrier-bound proteins obtained by the process according to the present invention, the carrier of which is not cross-linked.

If no cross-linker is used, then carrier materials are obtained which are soluble or thermoplastic. Carrying out the process of the present invention in this way gives spinnable or extrudable solutions from which the carrier-bound proteins can be obtained, for example, in filament form or in the form of foils, by known methods. Filaments or foils of this kind, with active protein covalently bound, can be stretched, spun and worked up to other products according to the known methods of synthetic resin technology and contain the bound active protein and can be used for purposes in which these forms offer especial advantages, for example, for the production of enzymatically-active sieves, fabrics, implantable filaments and the like.

For spinning from aqueous solution, there can, for example, be used the vacuum spinning process in which the solution is forced through a spinneret into a vacuum. This can take place under the conditions of a lyophilization, which can be tolerated by most active proteins, without loss of activity.

It is also important, for the process according to the present invention, that the protein is first reacted with the epoxy compound, whereafter the intermediate product obtained is fixed on to the carrier substance. The reaction of the protein with the epoxy compound normally needs no special measures. It is usually sufficient to bring the protein and epoxy compound together at ambient temperature in aqueous solution. It is hereby expedient to work in a buffered aqueous solution, the pH value of which is appropriate for the protein in question. The period of reaction between protein and epoxy compound depends upon the particular substances used but, in general, is between about 5 minutes and 1 hour. Longer or shorter incubation times can, however, also be expedient from case to case.

The reaction of protein and epoxy compound can, as mentioned, be carried out in the presence of the carrier or of the starting products for the carrier. In the latter case, the polymerization reaction is expediently initiated, after the formation of the pre-product, by the addition of an initiator. As initiators, there can be used the initiators and catalysts conventionally employed in polymer chemistry insofar as they do not disadvantageously influence the activity of the protein. As initiators or catalysts, there can, for example, be used, in the case of olefinically-unsaturated monomers or pre-polymers, inorganic or organic peroxides, azo compounds and the like. In addition, reaction accelerators, such as amines and the like, can be used. When using acrylic acid or methacrylic acid derivatives as monomers, the use of an initiator combination of a peroxydisulphate and an amine, such as 3-dimethylamino-propionitrile, has proved to be especially useful. When using this initator combination, it is expedient to work under an inert atmosphere, for example under nitrogen.

When the process products are directly formed as insoluble materials, they can be isolated by simple filtering, followed by washing. If the carrier is not cross-linked and remains in solution, the solvent can be removed in the usual way, for example, as mentioned above by vacuum spinning.

The process according to the present invention provides a number of important advantages. Of especial importance is that it is possible, according to the present invention, bind sensitive proteins and protein-containing materials, for example enzymes, which are composed of several subunits, to carriers without great loss of activity. In the case of the previously known methods for fixing sensitive proteins onto carriers, the sensitive proteins were, in almost all cases, deactivated or preparations were obtained of low storage stability and low activity. In contradistinction thereto, the process according to the present invention permits a bonding of sensitive proteins to carriers in an especially gentle manner. Furthermore, by means of the process according to the present invention, there is achieved a certain spatial separation of the bound protein from the actual matrix or carrier substance since the epoxy compound is present as intermediate member. In the case of swelling processes and the like, the enzyme or protein bond is thereby protected. This superiority is shown, for example, in that, in the case of the fixing of the enzyme ureas onto diethylaminoethyl-cellulose according to the known triazine process, a product is obtained with an activity of 4.9 u./g., whereas, in the case of the use of the process according to the present invention, with the use of an identical enzyme activity, a product is obtained, in the form of a lyophilizate, with an activity of 1200 u./g. which, even after storage for several weeks at a temperature of 34° C., shows no loss of activity.

Similarly, according to the above-mentioned known process, the enzyme glucose oxidase could admittedly be bound to cellulose with an activity of 300 u./g. of lyophilizate, after 11 days' storage, the activity had already dropped to less than half. With the process according to the present invention, when using the same amount of enzyme, there can be obtained almost twice as high activity yields and the product obtained can subsequently be kept for more than half a year, with constant use as a catalyst, without a substantial decrease of activity taking place.

When using the especially preferred embodiment of the process of the present invention by polymerization in the presence of olefinically-unsaturated monomers, especially of acrylic acid and methacrylic acid derivatives, a product is obtained which is especially stable against attack by microorganisms, has a readily controllable swelling behavior, which is important if the product is to be used as a column filling; furthermore, the product is easily adjusted to the desired charge or is free from charge. A further, general advantage of the process according to the present invention is also the especial simplicity with which it can be carried out.

The following Examples 1 and 3 to 8 are given for the purpose of illustrating the present invention and Example 2 is given for the purpose of comparison:

EXAMPLE 1

Starting substances:

0.1 g. glucose oxidase (GOD), 220 u./mg., acrylamide,
acrylic acid-(2,3-epoxypropyl ester),
N,N'-methylene-bis-acrylamide,
3-dimethylaminopropionitrile,
ammonium peroxydisulphate Method: 0.1 g. GOD were dissolved at 30° C. in 2 ml. 0.5 M triethanolamine buffer (pH 8.0) under an atmosphere of nitrogen mixed with 0.25 ml. acrylic acid-(2,3-epoxypropyl ester) and stirred for 30 minutes. Subsequently, the reaction mixture was cooled to +10° C. and mixed with 3 g. acrylamide and 0.1 g. N,N'-methylene-bis-acrylamide dissolved in 18 ml. distilled water.

Under an atmosphere of nitrogen, after about 15 minutes, the polymerization was started with 0.5 ml. 5 percent 3-dimethylaminopropionitrile and 3 ml. 5 percent ammonium peroxydisulphate. The solution first became viscous after about 5 minutes and then further polymerized to give a yellow, clear and stiff gel. The polymerization block obtained was then left to stand for about 18 hours in a refrigerator. The polymerizate was subsequently forced through a metal sieve of 0.5 mm. mesh size and washed with about 2000 ml. distilled water. The gel particles were then filled into a column of 2 cm. internal diameter and washed out with 0.2 M potassium phosphate buffer (pH 7.5) to remove adsorptively bound GOD until no enzyme activity was detected in the eluate. 10% of the originally used enzyme activity was detected in the eluate. The enzymatic activity of the carrier-bound enzyme, obtained as a lyophilizate, was 500 u./g.

EXAMPLE 2 (COMPARATIVE EXAMPLE)

The process of example was repeated, except that the epoxy compound was omitted.

3.0 g. acrylamide and 0.1 g. N,N'-methylene-bis-acrylamide in 18 ml. distilled water were mixed, with stirring and cooling, with 0.1 g. GOD, dissolved in 2 ml. 0.05 M triethanolamine buffer (pH 8.0). Subsequently, as in Example 1, the initiator solution was added, under an atmosphere of nitrogen, and the product worked up as described in Example 1.

About 40% of the enzyme activity initially used was again found in the eluate. After lyophilization of the product obtained, the activity of the lyophilizate was 90 to 100 u./g.

EXAMPLE 3

Starting substances:

GOD-I, 220 u./mg.,
acrylamide,
acrylic acid-(2,3-epoxypropyl ester),
N,N'-methylene-bis-acrylamide,
3-dimethylaminopropionitrile,
ammonium peroxydisulphate Method: 0.15 g. GOD were dissolved in 1.5 ml. distilled water and 1.5 ml. 1.0 M triethanolamine buffer (pH 8.0) and the solution cooled to +10° C., under an atmosphere of nitrogen. This solution was mixed with 3.0 g. acrylamide and 0.1 g. N,N' - methylene - bis - acrylamide, dissolved in 14 ml. water. 0.25 ml. acrylic acid-(2,3 - epoxypropyl ester) was added and the reaction started with 0.5 ml. 5% 3-dimethylaminopropionitrile and 0.2 ml. 5% ammonium peroxydisulphate. The period of polymerization was about 10 minutes. The polymerization block obtained was forced through a metal sieve and further worked up in the manner described in Example 1. According to the activity test on the eluate, all the protein was covalently bound. The activity of the lyophilizate obtained was 140 u./g.

EXAMPLE 4

Starting substances:

GOD-I, 220 u./mg.,
acrylamide,
1-(allyloxy)-2,3-epoxypropane,
N,N'-methylene-bis-acrylamide,
3-dimethylaminopropionitrile,
ammonium peroxydisulphate Method: 50 mg. GOD were dissolved at 30° C., under an atmosphere of nitrogen, in 0.5 ml. distilled water and 0.5 ml. 1 M triethanolamine buffer (pH 8.0) and incubated at 30° C. with 0.1 ml. 1 - (allyloxy) - 2,3-epoxypropane for 40 minutes. Subsequently, the reaction mixture was cooled to 10° C. and mixed with 3 g. acrylamide and 0.1 g. N,N' - methylene - bis - acrylamide, dissolved in 20 ml. bidistilled water. The further working up took place as described in Example 1. 10% of the originally used enzyme activity was detected in the eluate. The activity of the lyophilizate obtained was 210 u./g.

EXAMPLE 5

Starting substances:

uricase, 4.5 u./mg., dissolved in 50% glycerol,
0.05 M glycine and 0.13 M sodium carbonate,
acrylamide,
acrylic acid-(2,3-epoxypropyl ester),
N,N'-methylene-bis-acrylamide,
3-dimethylaminopropionitrile,
ammonium peroxydisulphate Method: 10 mg. uricase were dialyzed at 4° C. for about 4 hours against 1 litre 0.01 M glycine buffer (pH 10). The dialyzate was mixed with 1 ml. 1 M triethanolamine buffer (pH 8.0) and was incubated at 10° C., under an atmosphere of nitrogen, in the presence of 0.1 ml. acrylic acid-(2,3-epoxypropyl ester) and stirred for 30 minutes. Working up took place as described in Example 1. The activity of the lyophilizate obtained was 3.5 u./g.

EXAMPLE 6

Starting substances:

hexokinase, 140 u./mg.,
acrylamide,
acrylic acid-(2,3-epoxypropyl ester),
N,N'-methylene-bis-acrylamide,
3-dimethylaminopropionitrile,
ammonium peroxydisulphate Method: 20 mg. hexokinase crystal suspension were dissolved in 5 ml. water and dialyzed at 4° C. against 1 litre 0.01 M triethanolamine buffer (pH 8.0). The reaction mixture was incubated at 10° C. under an atmosphere of nitrogen in the presence of acrylic acid-(2,3-epoxypropyl ester) and, after 30 minutes, was cooled to 10° C. The enzyme solution was then mixed with 3 g. acrylamide and 0.1 g. N,N'-methylene-bis-acrylamide, dissolved in 20 ml. distilled water. The further working up took place as described in Example 1. The activity of the lyophylizate obtained was 12 u./g.

EXAMPLE 7

Starting substances:

glucose oxidase, 220 u./mg. (GOD),
1,2-epoxybut-3-ene,
acrylamide,
N,N'-methylene-bis-acrylamide,
3-dimethylaminopropionitrile,
ammonium peroxydisulphate Method: 100 mg. GOD were dissolved at 30° C., under an atmosphere of nitrogen, in 2 ml. 0.5 M triethanolamine buffer (pH 8.0) and then incubated for 30 minutes with 0.05 ml. 1,2-epoxybut-3-ene. Subsequently, the reaction mixture was cooled to 10° C. and then mixed with 3 g. acrylamide and 0.125 g. N,N'-methylene-bis-acrylamide, dissolved in 18 ml. bidistilled water. The reaction mixture was then further worked up in the manner described in Example 1. 37% of the original enzyme activity was detected in the eluate. The lyophilizate obtained had an activity of 540 u./g.

EXAMPLE 8

Starting materials:

glucose oxidase, 220 u./mg.,
acrylic acid-(2,3-epoxypropyl ester),
acrylamide,
N,N'-methylene-bis-acrylamide,
3-dimethylaminopropionitrile,
ammonium peroxydisulphate Method: 100 mg. glucose oxidase were dissolved at 30° C., under an atmosphere of nitrogen, in 2 ml. 0.5 M triethanolamine (pH 8.0) and incubated for 30 minutes with 0.25 ml. acrylic acid-(2,3-epoxypropyl ester). Subsequently, the reaction mixture was transferred to a dialysis tube and dialyzed twice against 1000 ml. amounts of 0.05 M triethanolamine buffer (pH 8.0). The preincubated enzyme solution (volume 10 ml.) was cooled to 10° C., the volume was made up to 20 ml. with bidistilled water and then mixed with 3 g. acrylamide and 0.15 g. N,N'-methylene-bis-acrylamide. After passing in nitrogen, the reaction mixture was further worked up in the manner described in Example 1. 5% of the originally used enzyme activity was detected in the eluate. The activity of the lyophilizate obtained was 305 u./g.

It will be understood that the specification and examples are illustrative but not limitative of the present invention and that other embodiments within the spirit and scope of the invention will suggest themselves to those skilled in the art.

What is claimed is:

1. Process for the preparation of a carrier-bound enzyme which process comprises reacting the enzyme in aqueous solution with a compound containing at least one epoxy group and at least one copolmerizable double bond, and polymerizing the resulting enzyme-epoxy-compound product in aqueous solution with a polymerizable olefinically unsaturated monomer.

2. Process as claimed in claim 1 wherein the carrier material is produced in situ in the aqueous reaction solution by the polymerization of a monomer or monomer mixture.

3. Process as claimed in claim 2 wherein the reaction of the enzyme with the epoxy compound is effected in the presence of a polymerizable monomer or monomer mixture, and then the polymerization is carried out to incorporate into the forming polymer the epoxy compound-enzyme reaction product.

4. Process as claimed in claim 2 wherein the polymerizable monomer or monomer mixture is added to said reaction aqueous solution after the reaction of the enzyme with the epoxy compound, and then polymerizing said monomer or monomer mixture.

5. Process as claimed in claim 1 wherein the enzyme/epoxy compound reaction is carried out at ambient temperature.

6. Process as claimed in claim 1 wherein the reaction and polymerization are carried out at about room temperature.

7. Process as claimed in claim 6 wherein said epoxy group-containing compound is of the formula

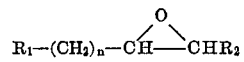

wherein $R_1$ is a mono- or poly-unsaturated alkenyl radical, an alkenyloxy radical or an unsaturated acyl, the CO group of which is conjugated with a carbon-carbon double bond;

$n$ is 0, 1 or 2; and $R_2$ is a hydrogen atom or a lower alkyl radical.

8. Process as claimed in claim 7 wherein $R_1$ is alkenyl of up to 10 carbon atoms.

9. Process as claimed in claim 7 wherein $R_1$ is alkenyloxy of up to 10 carbon atoms.

10. Process as claimed in claim 7 wherein $R_1$ is alkanoyl the CO group of which is conjugated with a carbon-carbon double bond.

11. Process as claimed in claim 7 wherein $R_2$ is hydrogen.

12. Process as claimed in claim 7 wherein $R_2$ is alkyl of up to 10 carbon atoms.

13. Process as claimed in claim 7 wherein said monomer is acrylic acid, methacrylic acid, or mixtures thereof.

14. Process as claimed in claim 1 wherein said carrier material is cross-linked with the epoxy compound-protein reaction product.

15. Carrier-bound protein produced by the process claimed in claim 1.

References Cited

UNITED STATES PATENTS

| | | | |
|---|---|---|---|
| 3,020,250 | 2/1962 | Norwalk | 260—6 X |
| 3,207,613 | 9/1965 | Merrill | 260—6 X |
| 3,314,905 | 4/1967 | Luce et al. | 260—8 |
| 3,522,197 | 7/1970 | Aranyl et al. | 260—8 |
| 2,882,250 | 4/1959 | Baker | 260—6 |

HOWARD E. SCHAIN, Primary Examiner

U.S. Cl. X.R.

195—68, DIG. 11; 260—8, 112 R